United States Patent [19]

Norton

[11] Patent Number: 4,548,091
[45] Date of Patent: Oct. 22, 1985

[54] MOTION CONVERTER FOR USE IN TRANSDUCERS AND THE LIKE

[76] Inventor: Peter Norton, 15612 Hilton, Southfield, Mich. 48075

[21] Appl. No.: 423,509

[22] Filed: Sep. 27, 1982

[51] Int. Cl.[4] .............................................. F16H 21/44
[52] U.S. Cl. .................................. 74/99 R; 74/388 PS
[58] Field of Search ................... 74/99 R, 100, 388 R, 74/388 PS; 180/79.3

[56] References Cited

U.S. PATENT DOCUMENTS

| 2,027,386 | 1/1936 | Krummer | 74/99 R |
| 2,362,930 | 11/1944 | Robbins | 180/147 |
| 2,531,905 | 11/1950 | Carpenter | 74/99 R X |
| 2,564,669 | 8/1951 | Brady | 74/99 R X |
| 2,930,359 | 3/1960 | MacDuff | 91/368 |
| 2,931,240 | 4/1960 | Von Thungen | 74/388 |
| 3,548,225 | 12/1970 | Vit | 74/99 R X |
| 4,003,446 | 1/1977 | Fleury | 180/132 |
| 4,133,215 | 1/1979 | Norris et al. | 74/89 |
| 4,312,126 | 1/1982 | Rochelt | 74/581 X |

FOREIGN PATENT DOCUMENTS 1097834 1/1961 Fed. Rep. of Germany .

Primary Examiner—Lawrence J. Staab
Assistant Examiner—Dwight G. Diehl
Attorney, Agent, or Firm—Reising, Ethington, Barnard, Perry & Milton

[57] ABSTRACT

A motion converter is disclosed which converts relative angular displacement to linear displacement. A pair of input members are coupled by plural axially extending links. There are plural amplifying arms, each being mounted on a respective one of the links and extending transversely thereof. An output member, in the form of a carrier ring, is mounted on the free ends of the arms. The carrier ring is displaced linearly by relative angular displacement of the input members. The motion converter may be incorporated in an angular displacement transducer.

11 Claims, 7 Drawing Figures

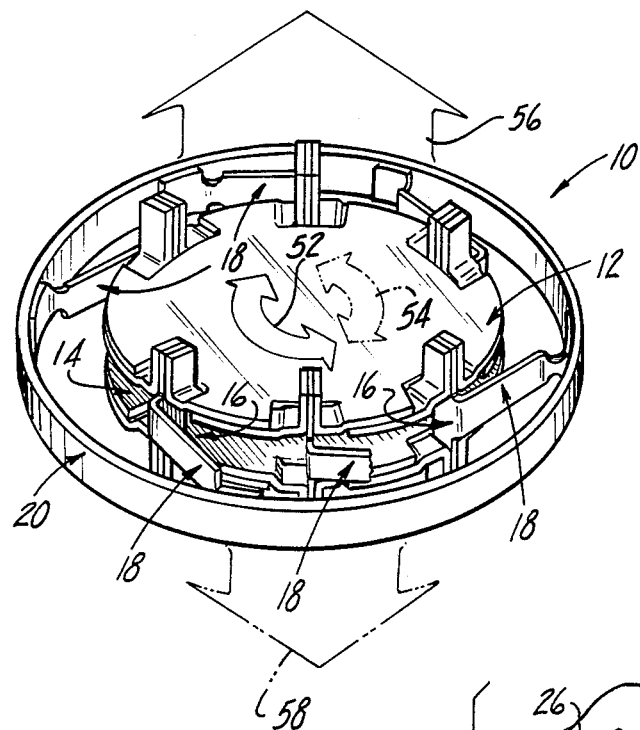
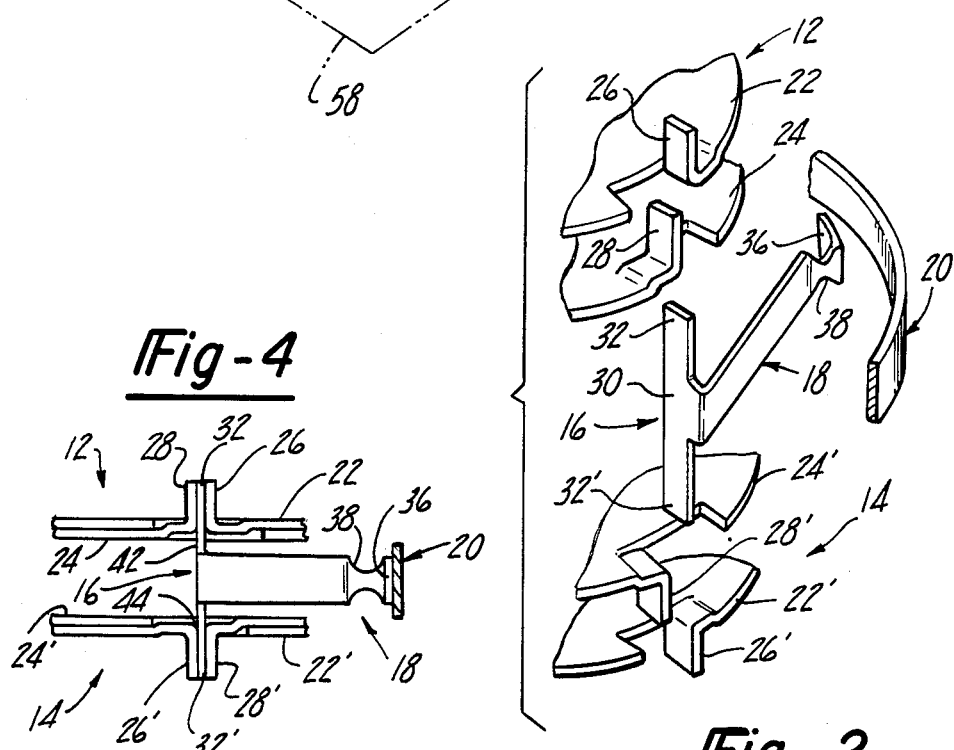
Fig-1
Fig-4
Fig-2

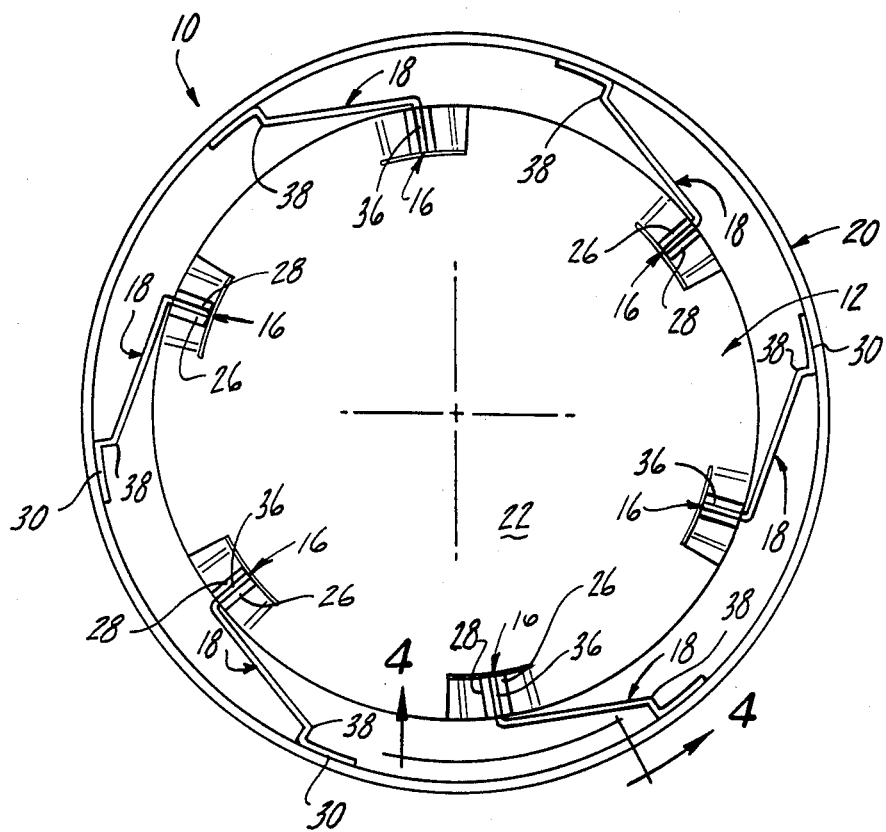
Fig-3
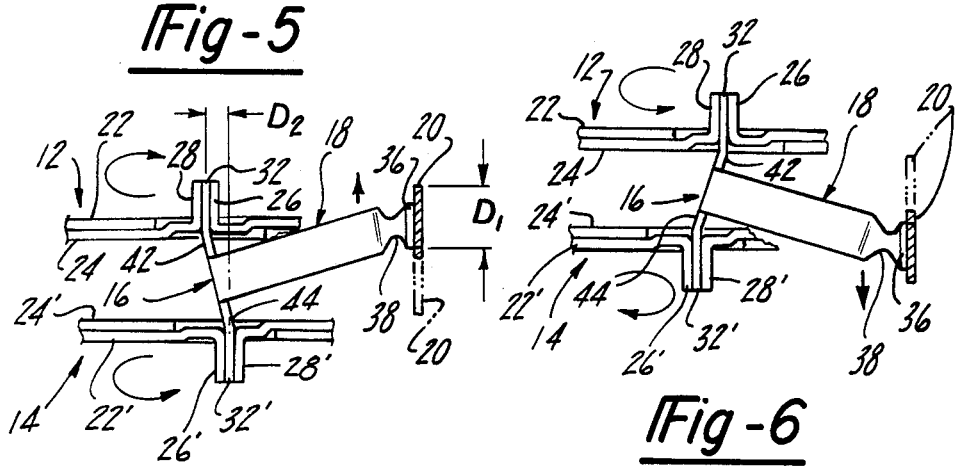
Fig-5
Fig-6

MOTION CONVERTER FOR USE IN TRANSDUCERS AND THE LIKE

FIELD OF THE INVENTION

This invention relates to devices for converting one form of motion into another. More particularly, it relates to devices for converting relative angular motion between two bodies into linear motion of a third body.

BACKGROUND OF THE INVENTION

The motion converting device of this invention was conceived and developed as a part of a transducer for use in vehicle power steering systems of the type using an electrical servo motor. In such systems, it is desired to develop an electrical signal which represents the magnitude and direction of the torque applied by the driver to the steering wheel of the vehicle. Such a signal is useful for controlling the energization of the servo motor for turning the dirigible wheels of the vehicle.

It is desirable in a power steering system of the type described, to have an angular displacement transducer which can produce the desired electrical signal in response to relative angular displacement between the steering wheel shaft and the input shaft of the steering gear with a torsionally resilient element between the two shafts to establish a relationship between torque and relative angular displacement. As used herein, an angular displacement transducer is a device that may produce an electrical signal corresponding to the angular displacement and/or to any time derivative of the angular displacement, such as angular velocity, angular acceleration, etc.

An angular displacement transducer for use in vehicle power steering systems must be capable of generating the desired signal even though the relative angular displacement is small. Further, it must be of compact and rugged construction and must lend itself to ease and economy of manufacture. Further, it should be adapted for installation between a driving and driven shaft, preferably in a coaxial relationship therewith.

The requirements for such angular displacement are admirably satisfied by use of a motion converter in which relative angular displacement is converted into linear displacement, preferably with amplification, in conjunction with a linear displacement sensor.

The prior art includes devices for torque measurement which are of general interest. The Templin U.S. Pat. No. 4,135,390 discloses an arrangement in which an engine shaft is bolted to the hub of a flex plate which has its outer periphery fastened to a torque converter of a transmission. An arcuate array of slots extending between the hub and the periphery of the drive plate define a plurality of spokes which carry the torque. The spokes bend or flex by an amount proportional to the torque and electromagnetic pickups are employed to obtain a measure of the spoke deflection. The Ruge U.S. Pat. No. 2,403,952 describes a torquemeter comprising a pulley with flexible spokes. Strain gages are placed on the spokes to produce an electrical signal corresponding to torque.

As will be become evident from the description that follows, this invention is addressed to the problem of converting relative angular displacement into linear displacement. As used herein, the term linear displacement means motion of a body which is substantially the same as or approximates rectilinear translation, as that term is used in the field of analytical mechanics. As discussed above, such a motion converter is useful in an angular displacement transducer. It will be recognized that such a converter is also useful in many other applications including for example, measurement and control devices as well as transducers of various kinds which involve input and output motion.

A general object of this invention is to provide an improved device for converting relative angular displacement to linear displacement.

SUMMARY OF THE INVENTION

This invention comprises a motion converter which converts relative angular displacement of a pair of input members to linear displacement of an output member. A plurality of coupling links extend axially between the input members. There are a plurality of amplifying arms, each arm being mounted on a respective one of the links and being movable therewith. Relative angular displacement of the input members causes the orientation of the links to change and the amplifying arms are angularly displaced in a direction and with a magnitude dependent upon the direction and magnitude of relative angular displacement of the input members. An output member is coupled with the arms for movement therewith whereby the output member is displaced linearly in response to relative angular displacement of the input members. A linear displacement sensor may be operatively coupled with the output member to provide a relative angular displacement transducer.

A more complete understanding of this invention may be obtained from the detailed description that follows taken with the accompanying drawings.

DESCRIPTION OF THE DRAWINGS

FIG. 1 is a perspective view of the motion converter of this invention;

FIG. 2 is an exploded view showing details of construction;

FIG. 3 is a plan view of the motion converter;

FIG. 4 is a view taken on line 4—4 of FIG. 3 with the motion converter in its normal or reference condition;

FIG. 5 is a view similar to FIG. 4 but with the motion converter actuated in one direction by relative angular displacement;

FIG. 6 is a view similar to FIG. 4 but with the motion converter actuated in the other direction by relative angular displacement.

BEST MODE FOR CARRYING OUT THE INVENTION

Figure 7:
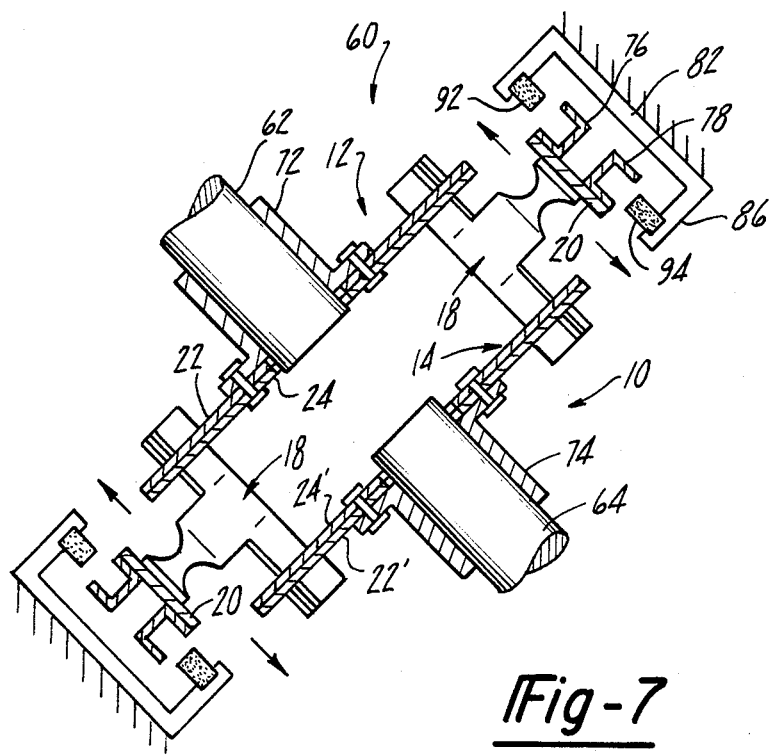
FIG. 7 shows the motion converter incorporated into an angular displacement transducer.

Referring now to the drawings, there is shown an exemplary embodiment of the invention in a motion converter for converting relative angular motion into amplified linear motion. The exemplary embodiment of the motion converter is applied to an angular displacement transducer. It will be appreciated, as the description proceeds, that the motion converter of this invention is useful in a wide variety of applications and lends itself to various forms of implementation.

The motion converter 10 of this invention is shown in perspective view in FIG. 1. It comprises, in general, a first input member 12 and a second input member 14, the input members being generally of circular disk configuration and are disposed in coaxial relationship. The input members 12 and 14 are coupled together by a set of links 16 which extend in an axial direction between the input members. Each link is provided with an amplifying arm 18 extending transversely of the link. An output member in the form of a carrier ring 20 is mounted on the free ends of the amplifying arms 18 for movement therewith.

The motion converter will be described in greater detail with reference to FIGS. 2, 3 and 4. The input members 12 and 14 are suitably of the same construction and are preferably fabricated from sheet metal. The input member 12 comprises a pair of circular plates 22 and 24 which are assembled in face-to-face engagement. The plate 22 has plural tabs or tangs 26 struck out from the periphery of the plate and extending perpendicular thereto, there being one tang 26 for each link 16. Similarly, the plate 24 is provided with as plurality of tangs 28. As shown in FIG. 4, one end 32 of the link 16 is sandwiched between the tangs 26 and 28. The sandwich is secured together, suitably by spot welding. As mentioned above, input member 14 is of the same construction as input member 12 and comprises a pair of plates 22' and 24' having a respective plurality of tangs 26' and 28'. The other end 32' of the link 16 is sandwiched between the tangs 26' and 28' and secured thereto.

All of the links 16 and all of the arms 18 are of identical construction and are fabricated as a unitary body from sheet spring steel. As shown in FIGS. 2 and 4, the link 16 is a flat plate having a body portion 30 terminating in opposite end portions 32 and 32' which are joined with the input members 12 and 14, as described above. The amplifying arm 18 extends transversely from the link 16 and terminates in a free end 36. The arm 18 is provided with an articulated joint 38 implemented by reducing the cross-section adjacent the free end 36. As used herein, an articulated joint is any joint which allows angular movement between the members which are connected by the joint. The articulated joints in the exemplary embodiment are constructed as flexible hinges and are capable of being flexed about more than one axis. The carrier ring 20 is circular and is mounted on the free ends 36 of the arms 18 and joined thereto, suitably by spot welding.

Referring now to FIG. 4, it is to be noted that the joinder of the link with the input member 12 forms an articulated joint 42 at the juncture of the link with tangs 26 and 28. Similarly, an articulated joint 44 is formed at the juncture of the link with tang 26' and 28'. The joints 42 and 44 are flexible by reason of the resilience of the links. The articulated joints permit the body portion 30 of the link to be inclined relative to the plane of the input members 12 and 14. It is also to be noted that each arm 18 is joined with the carrier ring 20 by the articulated joint 38 mentioned above. The articulated joint 38 permits the free end 36 of the arm to be inclined relative to the radius of the arm by flexure of the joint.

The operation of the motion converter will now be described with reference to FIGS. 1, 4, 5 and 6. The input member 12 and the input member 14 are angularly displaceable relative to each other. Each input member may be reversibly displaced about its axis as indicated by the double headed arrows 52 and 54 or either input member may be fixed and the other displaceable in one direction or the other or both. As will be described, relative rotation of the input members 12 and 14 causes the carrier ring 20 to move upwardly as indicated by the arrow 56 or downwardly as indicated by the arrow 58 in FIG. 1, depending upon the direction of relative angular displacement.

With the input members 12 and 14 in a reference position, i.e. no relative angular displacement, the links 16, arms 18 and ring 20 are positioned as shown in FIG. 4. Assuming, for example, that the input member 14 is stationary and the input member 12 is angularly displaced in a clockwise direction (as viewed in FIG. 1), the links 16 will be inclined relative to the input member by reason of flexure of the articulated joints 42 and 44, as shown in FIG. 5. Accordingly, the amplifying arm 18 will be deflected upwardly by reason of its movement with the link. The plural arms 18 will be deflected in unison and the carrier ring 20 will be moved linearly along the axis of relative angular displacement. The movement of the ring 20 is permitted by the flexure of the articulated joints 38 and the action of the arms 18 in unison constrains the ring to linear axial movement. In FIG. 5, the linear displacement of the ring 20 is indicated as having a value D1 and linear displacement of the ends 32 and 32' of the links 16 is indicated as having a value of D2. It will be appreciated that amplification of motion is obtained to a degree dependent upon the relative lengths of the amplifying arms 18 and the body portions 30 of the links 16. The displacement of the carrier ring 20 will be the same as described above and shown in FIG. 5 if the input member 12 is stationary and the input member 14 is angularly displaced in a counterclockwise direction (as viewed in FIG. 1). Furthermore, the action of the motion converter is the same for the same relative angular displacement of the input members regardless of whether the relative displacement is produced by rotation of one or both of the input members.

Assume, for an additional example, that the input member 14 is stationary and the input member 12 is angularly displaced in a counterclockwise direction (as viewed in FIG. 1). This will cause deflection of the links 16 as indicated in FIG. 6 by reason of the flexure of the articulated joints 42 and 44. The arm 18 will be angularly displaced downwardly and the carrier ring 20 will be displaced linearly in the downward direction. The action is just the reverse of the described with reference to FIG. 5. The same action will be achieved by the same relative angular displacement regardless of whether the relative angular displacement is produced by displacing one or both of the input members.

FIG. 7 shows the motion converter of this invention embodied in an angular displacement transducer 60 such as that useful in a vehicle power steering system. In such an installation, the steering column includes an upper steering shaft 62 connected with the vehicle steering wheel (not shown). It also includes a lower steering shaft 64 which is connected with a steering gear (not shown). The upper and lower shafts are also interconnected by a lost motion connection (not shown) which provides an unyielding coupling between the shafts 62 and 64, thus providing a failsafe steering control in the event of failure of the power steering system. In the power steering mode of operation, the turning effort by the driver on the steering wheel causes relative angular displacement of the input members corresponding to the amount of torque applied by the driver and depending on the torsional resiliency of the motion converter. The transducer 60 is adapted to produce an electrical signal corresponding to the relative angular displacement between the upper and lower shafts 62 and 64. This signal is used for controlling a servo motor (not shown) which is connected through the drive gear to the dirigible wheels. When the servo motor displaces the dirigible wheels, the lower shaft 64 is also displaced so that there is relative movement between the shafts 62 and 64 tending to reduce the relative angular displacement and therefore tending to nullify the signal generated by the transducer. It should be noted that the motion converter 10 inherently exhibits a certain amount of torsional elasticity in the relative angular displacement of the input members 12 and 14. Therefore, measurement of relative angular displacement also provides a measurement of the corresponding torque. If desired, a torsion shaft (not shown) between the input members may be used to augment the torsional elasticity of the motion converter.

The angular displacement transducer 60 is comprised of the motion converter 10 as described above and a linear displacement sensor 70. The motion converter 10 is mounted on the upper steering shaft 62 and the lower steering shaft 64. For this purpose, a mounting sleeve 72 is nonrotatably attached to the shaft 62 and the input member 12 is secured to the sleeve for angular displacement therewith. Similarly, a mounting sleeve 74 is nonrotatably attached to the shaft 64 and the input member 14 is secured thereto for angular rotation with the shaft 64.

The displacement sensor 70 may take any one of several known forms; for illustrative purposes, a variable inductance sensor is shown. It comprises a pair of coils each of which is adapted to exhibit an inductance which varies with the relative angular displacement of the input members 12 and 14. The inductance of a first coil 92 is influenced by a core member 76 of annular configuration which is mounted on the carrier ring 20 for movement therewith. The inductance of a second coil 94 is influenced by an annular core member 78 which is also mounted on the carrier ring for movement therewith. The coils 92 and 94 are mounted on a coil support member 82 which is stationary as indicated in FIG. 7 by the schematic stationary mount 88. The relative reactances of the two coils are sensed by appropriate electric circuits.

When torque is applied to the upper steering shaft 62, it causes a relative angular displacement of the input members 12 and 14 of the motion converter. As previously described, the relative angular displacement causes the carrier ring 20 to be axially displaced in a direction and an amount depending upon the direction and magnitude of relative angular displacement. Accordingly, the inductance of one of the coils is increased and that of the other is decreased and the associated electric circuit produces a signal corresponding to the direction and magnitude of relative angular displacement.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A motion converter for converting relative angular displacement about a common axis between a pair of input members to linear axial displacement of an output member comprising:
    first and second coaxial input members and an output member,
    three or more links disposed in circumferentially spaced positions around said common axis, each link being coupled with each input member by means substantially constraining the movement of each link to rotation about a link axis perpendicular to said common axis,
    an arm mounted on each of said links and movable therewith,
    coupling means for coupling said output member to each of said arms and supporting said output member through said arms for said linear displacement, said output member being spaced from said input members to define a clearance therebetween, said output member being free of contact with said input members over an operating range of said output member,
    whereby relative rotation of said input members about said common axis causes linear motion of said output member in the direction of said common axis.

2. The invention as defined in claim 1 wherein said means is a hinge of flexible material.

3. The invention as defined in claim 1 including a linear displacement sensor sensitive to the axial displacement of said output member whereby the relative angular displacement of said input members is sensed.

4. The invention as defined in claim 1 wherein, said output member is a ring surrounding said arms.

5. The invention as defined in claim 3 wherein, the linear displacement sensor has rotational symmetry about said common axis.

6. A motion converter for converting relative angular displacement about a common axis between a pair of input members to linear axial displacement of an output member comprising:
    three or more links disposed in circumferentially spaced positions around said common axis, each link being coupled with each input member by an articulated joint, each articulated joint connecting a fixed point on a link to a fixed point on an input member,
    an arm mounted on each of said links and movable therewith,
    said output member being attached to each of said arms by an articulated joint integrally connecting a fixed point on the arm to a fixed point on the output member,
    said output member being spaced from said input members to define a clearance therebetween, said output member being free of contact with said input members over an operating range of said output member,
    whereby said output member is supported by and constrained to said linear axial displacement by said arms.

7. The invention as defined in claim 6 wherein each of said arms extends approximately perpendicular to a radius line from said axis to the respective link.

8. The invention as defined in claim 6 wherein said output member is a ring surrounding said arms.

9. The invention as defined in claim 6 wherein each of said articulated joints is a hinge of flexible material.

10. The invention as defined in claim 6 including a linear displacement sensor sensitive to the axial displacement of said output member whereby the relative angular displacement of said input members is sensed.

11. The invention as defined in claim 10 wherein the linear displacement sensor has rotational symmetry about said common axis.

* * * * *

UNITED STATES PATENT AND TRADEMARK OFFICE
CERTIFICATE OF CORRECTION

PATENT NO. : 4,548,091
DATED : October 22, 1985
INVENTOR(S) : Peter Norton

It is certified that error appears in the above-identified patent and that said Letters Patent is hereby corrected as shown below:

Column 3, line 16, delete "as" and insert -- a --.

Column 5, line 25, after "The" insert -- linear --.

Column 6, line 9, line 9 should start a new paragraph.

Signed and Sealed this

Twentieth Day of March, 1990

Attest:

JEFFREY M. SAMUELS

*Attesting Officer*　　*Acting Commissioner of Patents and Trademarks*